United States Patent
Goldberg et al.

[11] 3,924,009
[45] Dec. 2, 1975

[54] MINI KUGELET

[76] Inventors: Libby M. Goldberg, c/o George Spector, 3615 Woolworth Building, 233 Broadway; George Spector, 3615 Woolworth Building, 233 Broadway, both of New York, N.Y. 10007

[22] Filed: Aug. 27, 1973

[21] Appl. No.: 391,745

[52] U.S. Cl. ............... 426/132; 426/115; 426/120; 426/138
[51] Int. Cl.² ......................................... A23L 1/16
[58] Field of Search ........... 426/138, 120, 112, 115, 426/132

[56] References Cited
UNITED STATES PATENTS

| | | |
|---|---|---|
| 1,713,301 | 5/1929 | Rosskam .............................. 426/120 |
| 1,715,857 | 6/1929 | Meyer ................................. 426/138 |
| 2,156,145 | 4/1939 | Cavett et al. ....................... 426/138 |
| 2,211,816 | 8/1940 | Heise ................................. 426/115 |
| 2,451,318 | 10/1948 | Burstiner ............................ 426/120 |
| 3,366,486 | 1/1968 | Weinstein et al. .................. 426/138 |
| 3,764,344 | 10/1973 | Glabe ................................. 426/138 |

*Primary Examiner*—Jeanette M. Hunter

[57] ABSTRACT

A new food product that is made of noodle mixture and which is formed into cup cake shaped shells that are then filled with various sorts of fillings, and which then are packaged with at least several different filled ones in a same package, so that a purchaser can selectively choose one or another thereof for being eaten whenever wanted; such variety of shell fillings consisting either of various fruits, nuts, dairy creams, liquor flavor fillings, and the like.

2 Claims, 4 Drawing Figures

U.S. Patent  Dec. 2, 1975  3,924,009
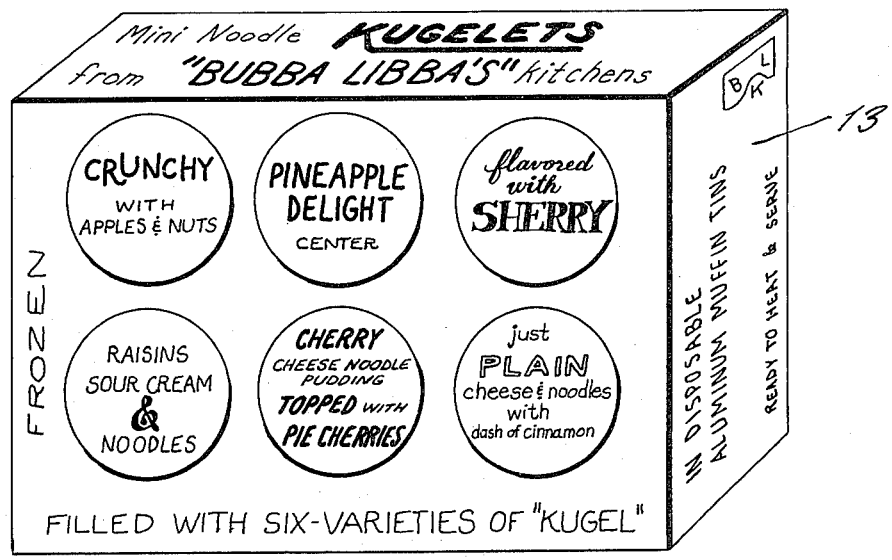
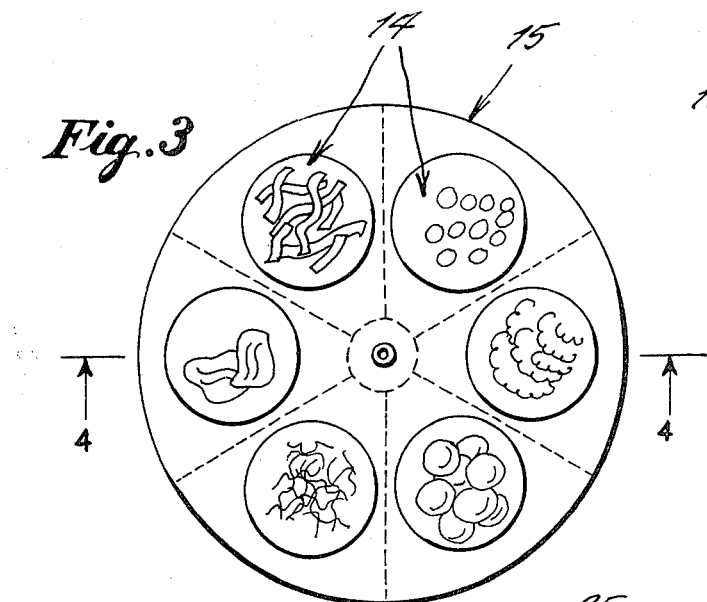
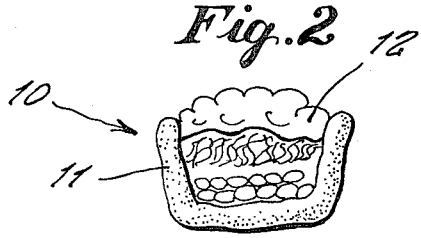
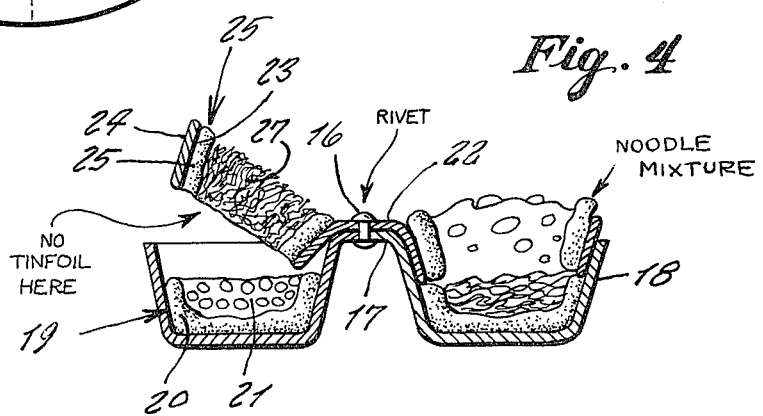

MINI KUGELET

This invention relates generally to new food products.

A principal object of the present invention is to provide a novel food that can be made in a large assortment of fillings and flavors so to appeal to all tastes.

Another object is to provide a novel food that is made up as individual mini kugelets which can be packaged with several within one box, and each mini kugelet in the box having a different flavor or filling so that when a person decides to eat one he has an available choice of one of them at that time.

Yet another object is to provide a mini kugelet which in one form of the invention can additionally give an even greater flavor and filling variety by variously combining the kugelets.

Other objects are to provide a mini kugelet which is simple in design, inexpensive to manufacture, rugged in construction, easy to use and efficient in operation.

These and other objects will be readily evident upon a study of the following specification and the accompanying drawing wherein:

FIG. 1 is a perspective view of a retail package that contains a variety of mini kugelets.

FIG. 2 is a side cross sectional view of one of the mini kugelets.

FIG. 3 is a top plan view of a modified design of the invention in which the mini kugelets of one package are placed upon a frame that aids in allowing the kugelets to be variously combined for producing numerous assortment of flavor combinations.

FIG. 4 is a cross sectional view taken on line 4—4 of FIG. 3 and showing the device in the process of changing flavor combinations.

Refering now to the drawing in detail and more particularly to FIGS. 1 and 2 at this time, the reference numeral 10 represents a mini kugelet according to the present invention, wherein the same consists of a cupcake shaped shell 11 that has a filling 12.

The shell 11 is made of a noodle mixture, which will form a firm edible container and the filling of the shell may consist of in-numerable types of preparations made either of fruits, nuts, dairy products, puddings or any other food or combination of these, as shown in FIG. 2. In a basic form of the invention, the filling 12 consists of cottage cheese, eggs and sour cream. However, as is indicated in FIG. 1 of the drawing, such filling may alternately consist of apples and nuts, pineapple preparation, a sherry flavored preparation, a preparation of raisins, sour cream and noodles, a cherry cheese noddle pudding, or just plane cheese and noodles with a dash of cinnamon. Endless other preparations can be used, such as puddings of eggs, rice, bread, and possibly such preparations may include meats or vegetables.

The mini kugelets are then packed as an assorted variety by several different ones being retailed in a package 13 that on its outer side is attractively decorated in colors and which indicates the particular assorment contained therein. Additionally a photograph of a company founder, may be included. Preferably it should be a photograph of a lady, such as is used by numerous large food companies, as it suggests the product is of a quality such as made by a mother, and therefore must be very good.

As the package suggests the product may be frozen so it can be oven heated by a consumer. Alternately it may be made ready to eat, instead, without heating.

In FIGS. 3 and 4, a modified design of the invention shows six mini kugelets 14 supported on a frame 15 that can be placed into a retail carton. The frame is comprised of two circular formed metal foils placed one above the other and which at their centers are attached together by single rivet 16. The lower foil 17 is bent to form six downward, cup-cake shaped, depressions 18 in each of which a mini-kugelet lower half 19 is contained and which consists of a shell 20 with a filling 21. Each of the shells 20 has a different filling. The upper foil 22 has six downward openings 23, each of which includes a downwardly tapered side flange 24 that fits into the upper position of depression 18, and the flanges each supports a mini kugelet upper half 25 that consists of a circular or tubular shell side wall 26 having a central filling 27, each of the six fillings being different from each other and different from any of those 21 that are in the shell 20.

Thus by bending upwardly the upper foil 22, the same can be rotated so to re-align different ones of the kugelet upper halves 25 with different of the kugelet lower halves 19 so that a very large variety of flavor combinations can be produced so to satisfy all tastes.

Thus a modified design of the invention has been provided.

While various changes may be made in the detail construction, it is understood that such changes will be within the spirit and scope of the present invention as is defined by the appended claims.

What is claimed is:

1. An adjustable food container in combinations with a plurality of food components adapted to combine interchangeably, comprising a pair of upper and lower metal foils, wherein each of said foils include spaced circular cuplike depressions and central overlapping portions pivotally secured at the center thereof with a rivet, whereby the foils are relatively rotatable and the depressions on each foil are circularly arranged at the same radial distance from the rivet, said depressions having complimentary dimensions wherein each depression in the upper foil will nest and be supported in each opposing depression in the lower foil, said food components comprising edible shell enclosed units mounted in the depressions wherein the units in the upper and lower depressions are jointed when the depressions are in a nesting position to form contiguous shell enclosing food units of varying combination depending upon the relative rotational position of the foils, wherein the shells are formed from a noodle mixture.

2. A food container as in claim 1 wherein the depressions in the lower foil have upwardly flaring side walls and circular bottom walls and wherein the depressions in the upper foil have upwardly flaring side walls with bottom openings, said upper foils being flexible whereby the upper foil can be bent upward and away from the lower foil for rotation purposes, and wherein the upper and lower shells will align when the upper side walls are nested in the lower side walls.

* * * * *